US012377326B2

(12) United States Patent
Geremia

(10) Patent No.: US 12,377,326 B2
(45) Date of Patent: Aug. 5, 2025

(54) HANDLE FOR SPORTS OR WORK EQUIPMENT AND EQUIPMENT COMPRISING THE HANDLE

(71) Applicant: HESACORE USA CORP., Aventura, FL (US)

(72) Inventor: Gianluca Geremia, Monteviale (IT)

(73) Assignee: HESACORE USA CORP., Aventura, FL (US)

( * ) Notice: Subject to any disclaimer, the term of this patent is extended or adjusted under 35 U.S.C. 154(b) by 0 days.

(21) Appl. No.: 18/743,450

(22) Filed: Jun. 14, 2024

(65) Prior Publication Data

US 2024/0325837 A1 Oct. 3, 2024

Related U.S. Application Data

(63) Continuation of application No. 17/019,279, filed on Sep. 13, 2020, which is a continuation of application (Continued)

(30) Foreign Application Priority Data

Dec. 30, 2015 (IT) ........................ 102015000089326

(51) Int. Cl.
*A63B 60/12* (2015.01)
*A63B 49/08* (2015.01)
(Continued)

(52) U.S. Cl.
CPC .............. *A63B 60/12* (2015.10); *A63B 49/08* (2013.01); *A63B 53/14* (2013.01); *A63B 60/08* (2015.10);
(Continued)

(58) Field of Classification Search
CPC ......... A63B 60/12; A63B 60/08; A63B 60/18; A63B 2102/04
See application file for complete search history.

(56) References Cited

U.S. PATENT DOCUMENTS 2,513,655 A * 7/1950 Lamkin .................. A63B 60/14
69/21
3,848,871 A * 11/1974 Sweet .................... A63B 49/08
473/549
(Continued)

*Primary Examiner* — Eugene L Kim
*Assistant Examiner* — Christopher Glenn
(74) *Attorney, Agent, or Firm* — Dunlap Bennett & Ludwig, PLLC

(57) ABSTRACT

A handle for sport equipment comprises a tubular body (7) which extends along a longitudinal axis (L) and has an outer peripheral surface (8) adapted to be grasped by a user and shaped with a plurality of longitudinal faces (9) placed side by side in correspondence of edges (10) adapted to facilitate the positioning of the finger joints of the gripping hand by the user. The edges (10) are arranged along at least one pair of helical or spiral paths that develop around said longitudinal axis (L) with mutually opposite sign to subdivide each of said longitudinal faces (9) into a plurality of areas or flat surfaces (11) sized to accommodate a corresponding phalanx of the gripping hand of the user, each of said areas or flat surfaces (11) being perimetrically delimited by at least one pair of edges (10, 10') of each of the helical or spiral paths.

25 Claims, 6 Drawing Sheets

Related U.S. Application Data

No. 16/066,684, filed as application No. PCT/IB2016/058096 on Dec. 30, 2016, now Pat. No. 10,773,140.

(51) Int. Cl.

| | |
|---|---|
| ***A63B 53/14*** | (2015.01) |
| ***A63B 59/42*** | (2015.01) |
| ***A63B 59/50*** | (2015.01) |
| ***A63B 60/08*** | (2015.01) |
| ***A63B 60/18*** | (2015.01) |
| ***A63B 60/48*** | (2015.01) |
| ***A63B 60/52*** | (2015.01) |
| ***A63B 102/02*** | (2015.01) |
| ***A63B 102/04*** | (2015.01) |
| ***A63B 102/06*** | (2015.01) |
| ***A63B 102/16*** | (2015.01) |
| ***A63B 102/18*** | (2015.01) |
| ***B25G 1/10*** | (2006.01) |

(52) U.S. Cl.

CPC .............. *A63B 60/18* (2015.10); *B25G 1/102* (2013.01); *A63B 59/42* (2015.10); *A63B 59/50* (2015.10); *A63B 60/48* (2015.10); *A63B 60/52* (2015.10); *A63B 2102/02* (2015.10); *A63B 2102/04* (2015.10); *A63B 2102/06* (2015.10); *A63B 2102/065* (2015.10); *A63B 2102/16* (2015.10); *A63B 2102/18* (2015.10)

(56) References Cited

U.S. PATENT DOCUMENTS

| | | | | |
|---|---|---|---|---|
| 4,108,436 A * | 8/1978 | Masi | A63B 60/18 | 74/551.9 |
| 6,083,125 A * | 7/2000 | West | A63B 60/22 | 473/549 |
| 6,520,867 B1 * | 2/2003 | Miura | A63B 53/12 | 473/316 |
| 2004/0121850 A1 * | 6/2004 | Rohrer | A63B 60/54 | 473/300 |

* cited by examiner

HANDLE FOR SPORTS OR WORK EQUIPMENT AND EQUIPMENT COMPRISING THE HANDLE

The present application is continuation of U.S. patent application Ser. No. 16/066,684, filed Jun. 28, 2018 as a national phase of International Patent Application PCT/IB2016/058096.

TECHNICAL FIELD

The present invention relates to the technical field of sports equipment and has for object a handle for sports equipment, applicable in particular to sports equipment designed to hit a ball, such as tennis racquets and the like, or to work equipment equipped with handles. The invention also relates to an equipment comprising the handle.

STATE OF THE ART

The racquet sports, such as tennis, beach tennis, badminton, paddle, squash and the like, involve the use of an equipment, generally called racquet, composed of a head, i.e. the equipment portion designed to hit the ball, and of a handle designed for grabbing the equipment and which the hand rests on to control the equipment itself.

Many racquets also comprise a throat, arranged between the head and the handle of the racquets.

The handle of the racquet generally comprises a shell or two specular half-shells, named pallets, assembled by means of an adhesive and firmly fastened to a rod which, together with the head and, if present, to the throat, makes the frame of the racquet.

A cap that can be glued or stapled to the pallets is usually positioned above the shell or the two half-shells, in the end portion of the racquet.

A ribbon, commonly called grip, is helically wrapped above the assembly comprising the cap and the pallets and fixed to the pallets through an adhesive.

The handle has generally a shape of a parallelepiped with an octagonal base, substantially constant along its whole development, except for the portion at the head or the throat, if present, of the racquet, wherein the section is tapered to join with the shape of the head or throat, and except for the part at the cap, wherein the section expands.

Therefore, this parallelepiped with octagonal base comprises eight elongated surfaces, generally planar, commonly called flat.

The eight flat surfaces are adjacent each other and their intersection forms eight edges which run substantially parallel along the longitudinal axis of the handle and of the racquet.

During the game, the players grab the racquet through the handle and, because the skill of the player is also to know how to make a variety of shots and to impart to the ball different effects of rotation, it is very common that the player change, between the execution of a stroke and the other, the position of the phalanges and of the palm of the hand on the handle.

For example, the gripping way to run a forehand is different from the way for a backhand, which in turn is different from the gripping way to run the service.

Nevertheless, within each type of stroke there are some techniques for imparting different rotations to the ball and which also provide ways to handle the racquet substantially different from each other.

In addition, the peculiar style of each player causes everyone has their own way of holding the racquet according to the stroke to be executed and according to the effect to give to the ball.

Therefore, the player has to constantly change the way of holding the racquet during the game, without he could see the handle because its focus is on the observation of the ball that is coming.

For this reason, the importance of the edges formed by the intersection of the flat surfaces is essential to allow the more experienced players to rely on their touch sensibility and properly hold the equipment depending on the shot they intend to run.

Today, the parallelepiped shape with octagonal base of the handle is commonly accepted as the best compromise to allow as many players as possible the proper execution of the greater number of possible shots, with the greatest possible comfort.

However, the octagonal base parallelepiped shape implies that the flat surfaces and the edges formed by the intersection of two adjacent flat surfaces, which extend parallel to the longitudinal axis of the handle, do not provide the best possible conformation to allow the fingers of the hand to firmly and comfortably adhere to the handle.

This is due to multiple reasons, a first of which is represented by the fact that the different length of the fingers causes that the joints that join the proximal phalanges to the medial phalanges and the joints that join the medial phalanges to the distal phalanges do not occupy a position equally distant from each other.

Secondly, the protuberance of the sesamoid bone of the thumb in contact with the planar shape of the flat surfaces does not allow an adequate adhesion of the phalanges of the thumb to the handle, nor greater force exerted by the muscles helps to tighten more firmly the handle with the thumb.

Furthermore, the protuberances of the heads of the second and fifth metacarpal bone in contact with the planar shape of the flat surface do not allow a comfortable adhesion of the palm of the hand to the handle.

Moreover, the playing technique provides that, when the shots are run, the fingers of the hand are never positioned perpendicularly to the longitudinal sections of the handle, but instead they envelop the handle diagonally with respect of the longitudinal axis of the handle.

As a consequence, with a handle having a shape of an octagonal base parallelepiped, the edges formed by the intersection of the flat surfaces are never perpendicular to the natural position of the fingers on the handle.

To overcome these problems, especially for equipment designed for less experienced players, very soft and high thickness grips are used, that provide greater comfort for the holding. In this way, you have to relies on the pliability of the material of which the grip is composed to accommodate the shape of the hand.

The grip can be designed with a section having different shapes and produced in different materials to perform other functions and to also tackle other drawbacks that the player may experience when playing the games.

If it is manufactured with elastic or visco-elastic materials, the grip has the function of absorbing the vibrations produced from the frame when the ball is hit, which can be harmful and which may bring problems at the wrist and the elbow of the less trained and experienced players.

If it is produced in hydro-absorbent materials, which may present a sticky contact surface, the grips contrast the slipping of the handle due to perspiration of the hand.

Most players use of one or more overgrips, i.e. a ribbon of a water-absorbent material which is helically wound over the grip, in order to reduce the slipperiness of the handle.

This trick relies is effective with a good state of preservation of the grip and of the overgrip, but it also has some drawbacks due to the fact that the application of the overgrip involves a change in the diameter of the octagonal section of the handle.

Not least, the application of the overgrip involves a chamfer of the eight edges formed by the intersection of the flat surfaces.

As a result, the application of a grip having a great thickness, even more if combined with the use of the overgrip, while being useful for giving greater comfort and to counter the effects of sweating, leads to a deterioration of tactile sensitivity and to a deterioration of the ability of controlling the equipment.

Nevertheless, the constant rubbing of the hand on the handle, as well as the stagnation of sweat produced by the hand, degrade very quickly the original features of the materials of the grip and of the overgrip, making null the intrinsic peculiarities within a few hours game.

In the past, several attempts have been made to try to solve the drawbacks connected to the comfort of the handle of the racquets.

For example, US20100056308 A1 provides an insert of plastic material to be placed above the original pallets to make the handle ergonomic.

However, the aim of this system is to resolve the problem of adhesion of the palm of the hand to the handle, while it is more important to solve the problem of adhesion and the comfort of the fingers, which are deputed to exert the force to tighten the handle.

U.S. Pat. Nos. 6,149,538 A and 4,108,436 A disclose some solutions to improve air circulation below the grip.

These solutions provide for a modification of the rod structure of the frame and therefore they are not usable by users already in possession of the racquet, but they may be inserted only in the production stage of a new tool.

Then, having to modify the structure of the frame implies the need of having to face considerable costs for the evaluation of structural stability of the whole racquet, as well as for the realization of new molds.

U.S. Pat. No. 8,323,130 B1 discloses a handle for racquets wherein longitudinal inserts are positioned at the edges, whose object is to improve the comfort of the grip and the handle reactivity.

However even in this case the drawback linked to the different positions that the hand may assume during the game is not solved.

EP 2401042 B1 discloses a handle provided with slots for the phalanges in different grip situations, which, however, oblige the player to keep the phalanges in a predetermined position, without taking into account the gripping way that differ from player to player.

Scope of the Invention

The object of the present invention is to overcome the above drawbacks, providing a grip for sport or work equipment which is particularly efficient and economical.

A particular object is to provide a handle for sports or work equipment that allows to hold the equipment always in a firm manner and with maximum comfort and ergonomics also after the rotation of the hand during the action, ensuring at the same time maximum adherence.

Still another object is to provide a handle for sports equipment that allows a better grip of the racquet, and which results in an exaltation of the tactile sensitivity of the player, also in the presence of grip and overgrip.

It is also an object of the present invention a handle that can be adapted to effectively counter the problems linked to sweating of the hand if the user might have this need.

Still, it is an object of the present invention a handle having the above features and that can be produced, manufactured and installed in effective and cost-effective way.

Another object is to provide a handle for sports or work equipment wherein the edges formed by the intersections of adjacent areas or flat surfaces, are more ergonomic and comfortable, in the different modes of holding the equipment.

In particular, it is an object of the present invention a handle wherein there is a series of edges, formed by the intersections of adjacent flat surfaces, whose position is at the joints that join adjacent phalanges, in the multiple mode of holding the equipment.

More in detail, an object of the present invention is a handle wherein there is a series of edges, formed by the intersections of adjacent flat surfaces, which are preferably perpendicular or parallel with respect to the natural disposition of the fingers on the handle, in the multiple mode of holding the equipment.

It is an object of the present invention a handle wherein the flat surfaces are more ergonomic and comfortable, in the different modes of holding the equipment.

In particular, it is an object of the present invention a handle wherein there is a series of areas or flat surfaces, whose position is in correspondence of the main eversion and protrusions of the hand, whether the fingertips, the sesamoid bone, the styloid process of the ulna, the heads of the second and the fifth metacarpal bone, and the like, in the many ways of holding the equipment.

More in detail, an object of the present invention is a handle which allows a better coupling with the main protrusions of the hand, in the multiple mode of holding the equipment.

Still another object of the invention is to provide a handle for sports equipment that improve the air circulation below the grip for counteracting the sweating.

These objects, as well as others which will become clearer hereinafter, are achieved by a handle for sports or work equipment that, in accordance with claim 1, comprises a tubular body extending along a longitudinal axis and having an outer peripheral surface adapted to be grasped by a user, which outer peripheral surface is shaped with a plurality of adjacent longitudinal faces having edges which extend along said longitudinal axis to facilitate the positioning of the finger joints of the gripping hand by the user.

The edges are arranged along at least one pair of helical or spiral paths that develop around said longitudinal axis with opposite sign to subdivide each of said longitudinal faces into a plurality of areas or flat surfaces dimensioned to house a corresponding phalanx of the gripping hand of the user, each of said areas being perimetrically delimited by at least one pair of edges of different helical or spiral paths of said pair.

Thanks to this combination of features the handle will always ensure the comfortable and ergonomic positioning of the hand in any gripping condition and also upon rotation relative to the handle.

As matter of fact, the peculiar arrangement of the edges will allow to position the same at the joints that join adjacent phalanges, in the multiple mode of the holding the equipment, also allowing a better coupling with the main protrusions of the hand.

Furthermore, the ergonomics of the grip will be guaranteed for any size of the hand because the continuous and homogeneous distribution of the flat surfaces will ensure that there will always be some surfaces in a suitable position.

Suitably, said helical or spiral paths may have substantially the same longitudinal pitch that may be constant or variable along said longitudinal axis, so as to further improve the ergonomics by adapting the position of the edges to the typical conformation of each finger of the hand.

Advantageously, the areas or flat surfaces may be substantially concave or inwardly recessed to provide more ergonomic and comfortable flat surfaces in any holding mode.

Conveniently, each of said areas may be perforated to realize a comfortable and lightweight grip.

Not least, the tubular body may include one or more longitudinal aeration channels open at the ends and which extend along respective longitudinal rows of faces, to improve air circulation below a possible grip or overgrip and counter the sweating.

Advantageous embodiments of the invention are obtained in accordance with the dependent claims.

BRIEF DISCLOSURE OF THE DRAWINGS

Further features and advantages of the invention will become more apparent in light of the detailed description of some preferred but not limiting embodiments of a handle for sports equipment according to the present invention, shown by way of non-limiting example with the aid of the accompanying drawings wherein.

BEST MODES OF CARRYING OUT THE INVENTION

Figure 1:
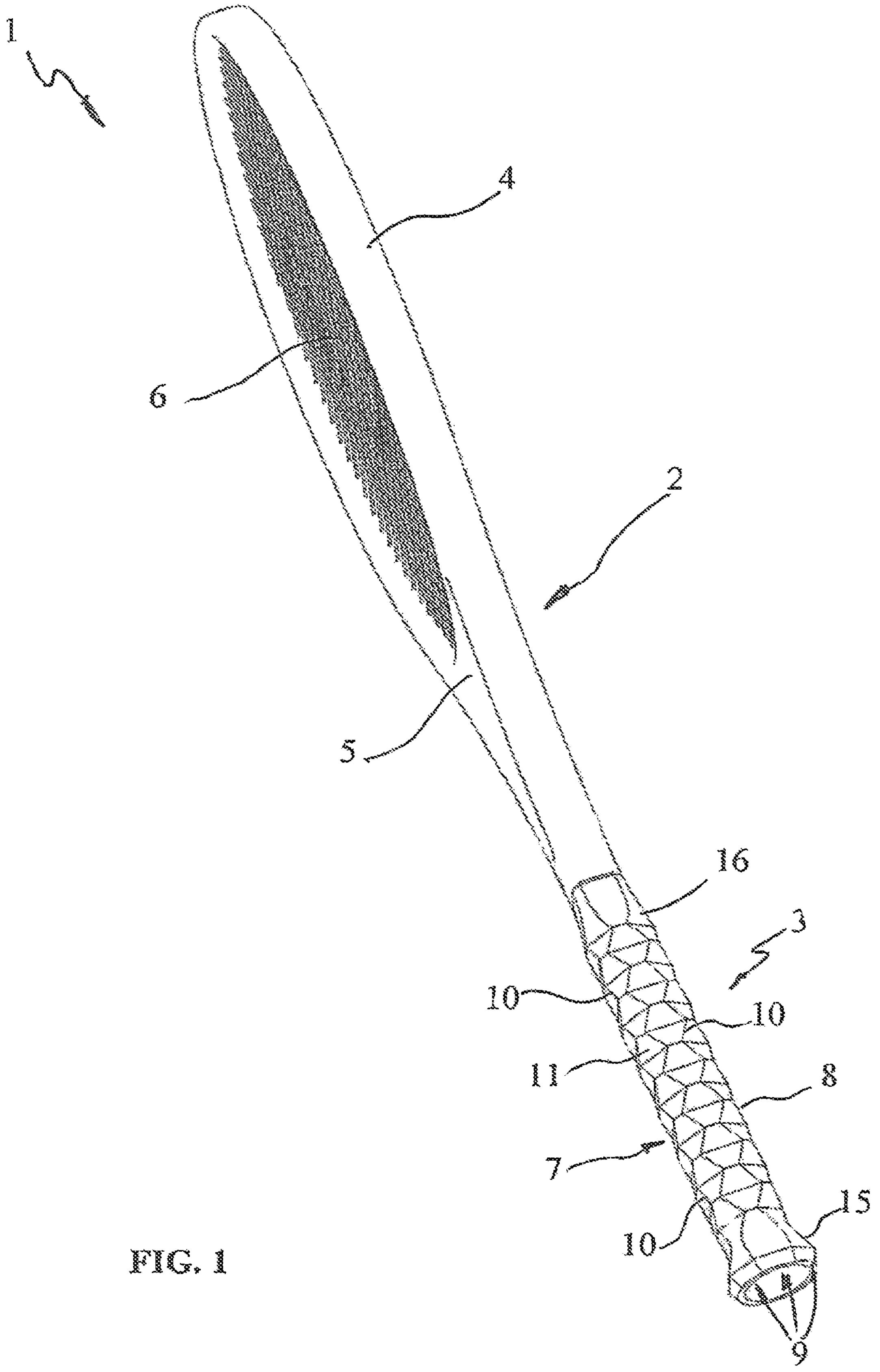
FIG. 1 is a perspective view of a sport equipment provided with the handle in a first preferred embodiment.

With reference to the attached figures three preferred but not exclusive embodiments of a handle according to the invention are shown applied to a sport equipment.

In particular, the sport equipment, generically referred with 1, is a tennis racquet that in typical fashion comprises a frame 2 formed with the handle 3 joined to a head 4 through a throat 5. In a known manner the head 4 is also provided with strings 6.

Both the head 4 and the throat 5 are not essential elements for the present invention and therefore can be realized in any manner, without particular limitations, and for this reason they will not be described more in detail hereinafter.

The handle 3 according to the invention may be applied in a similar manner and with the necessary adaptations to other sports equipment such as racquets for table tennis, squash, badminton, golf clubs, baseball bats and particularly to all equipment requiring different holding modes during the different phases of the game.

Moreover, the handle may also be applied to work equipment or tools that require a firm grip and wherein the position of the grabbing may vary depending on the mode of use, as in the case of drills, screwdriver and similar tools.

Furthermore, the handle may be either realized both as a separate body with respect to the equipment and subsequently applied thereto in a fixed or removable manner or made directly on the equipment, being also in this case fixed or removable.

FIG. 1 shows a first embodiment of the sport equipment 1 from which it is noted that the handle 3 essentially comprises a tubular body 7 which extends along a longitudinal axis L and which has an outer peripheral surface 8 adapted to be grasped by a user.

The outer peripheral surface 8 is shaped with a plurality of longitudinal faces 9 in side by side relationship with each other each having a plurality of edges 10 which extend along the longitudinal axis L to facilitate the positioning of the finger joints of the gripping hand by the user.

Figure 2:
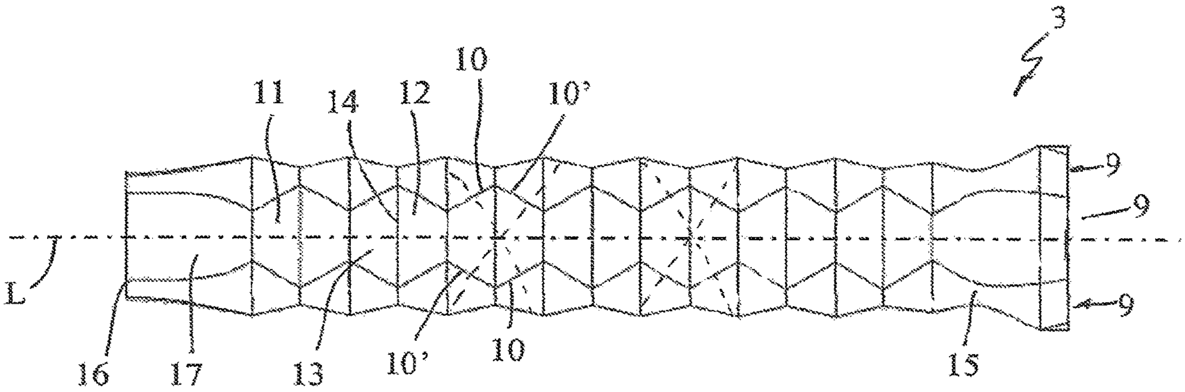
FIG. 2 is a first side view of the handle of the equipment of FIG. 1.
Figure 3:
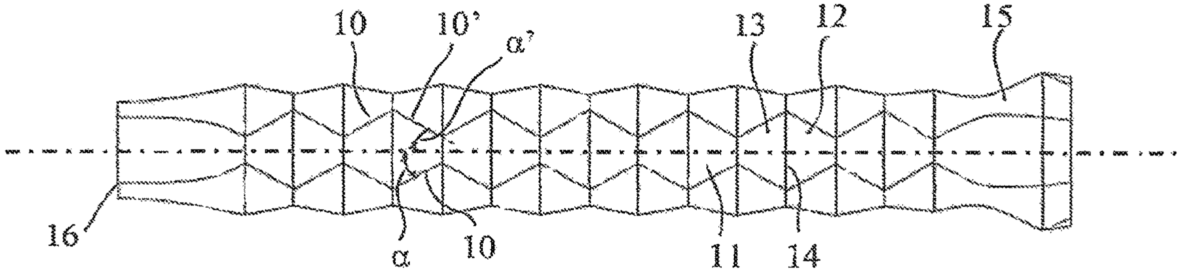
FIG. 3 is a second side view of the handle of the equipment of FIG. 1.
Figure 4:
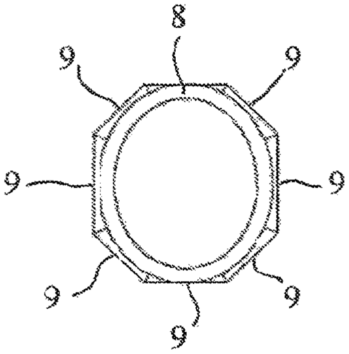
FIG. 4 is a front view of the handle of the equipment of FIG. 1.

As it can be seen more clearly from FIGS. 2 and 3, the edges 10 are arranged along at least one pair of helical or spiral paths, shown with dashed lines, which develop around the longitudinal axis L with opposite sign.

In this way each of the longitudinal faces 9 will be divided into a plurality of areas or flat surfaces 11 longitudinally aligned and dimensioned so that in the multiple mode of gripping the handle 3 they may accommodate a corresponding phalanx of the gripping hand of the user, or the main knobs and protrusions of the hand, such as the fingertips, the sesamoid bone, the styloid process of the ulna, the heads of the second and fifth metacarpal bone and the like.

In a preferred manner the areas or flat surfaces 11 will have the same shape and size with a maximum size that defines the distance between two consecutive edges 10 of a same spiral comprised between 10 mm and 30 mm and preferably close to 20 mm.

The areas or flat surfaces 11 will be delimited perimetrically by two pairs of consecutive edges 10 of each of the two different spiral paths of the pair.

From the figures it is also noted that the edges 10 are arranged on a plurality of pairs of helical or spiral paths having mutually opposite sign to define respective double helices.

In this way, each longitudinal face 9 will be divided into a plurality of consecutive and adjacent areas or flat surfaces 11.

In the shown embodiment all the helical or spiral paths have substantially the same constant longitudinal pitch value.

However, according to alternative variations, not shown, the pitch may also be variable and possibly different for the various spiral paths.

Furthermore, in the shown embodiment the edges 10 are substantially straight and inclined with respect to the longitudinal axis L with the same inclination angle $\alpha$.

Moreover, the inclination angle $\alpha$ of the edges 10 of one of the paths has the same module and of opposite sign than the inclination angle $\alpha'$ of the edges 10' of the other spiral path of the corresponding pair to delimit corresponding areas 11 having substantially hexagonal plan shape.

In the preferred but not exclusive embodiment of the figure, the areas or flat surfaces 11 are hexagonal with two transverse sides that join edges 10, 10' belonging to different spirals of a same pair having a length between 15 mm and 25 mm, preferably between 18 mm and 22 mm and even more preferably close to 20 mm.

The diagonal which joins edges 10, 10' opposite each other is between 10 mm and 30 mm and is preferably close to 20 mm.

However, even in this case, different embodiments may be provided with angles variable both along a same spiral path and between several spiral paths. In addition, the edges 10, 10' may also be non-rectilinear, for example curved with curvature that extends in a transverse plane inclined relative to the longitudinal axis L.

The areas or flat surfaces 11 will also be recessed inwards and formed by two trapezoidal portions 12, 13 converging towards a common median edge 14 substantially transverse and belonging to a symmetry plane of the respective area 11 orthogonal to the longitudinal axis L. The handle 3 will be closed at the bottom by a base 15 which can itself be shaped in a corresponding manner to the longitudinal faces 9 so as to define a continuity with the corresponding areas or flat surfaces 11.

Similarly, the upper end 16 of the handle 3 may be shaped with a plurality of concavities 17 suitably radiused to the throat 5 of the equipment 1.

The handle 3 may be realized as a single body or may be formed by a pair of specular half-shells adapted to be coupled to the frame 2 of the equipment 1 by bonding with adhesive or other fastening techniques typical for this type of sports equipment.

In particular, the adhesive may be applied in a not removable manner during the assembly in the factory or may be detachable and replaceable by the user who already owns the equipment.

Figure 5:
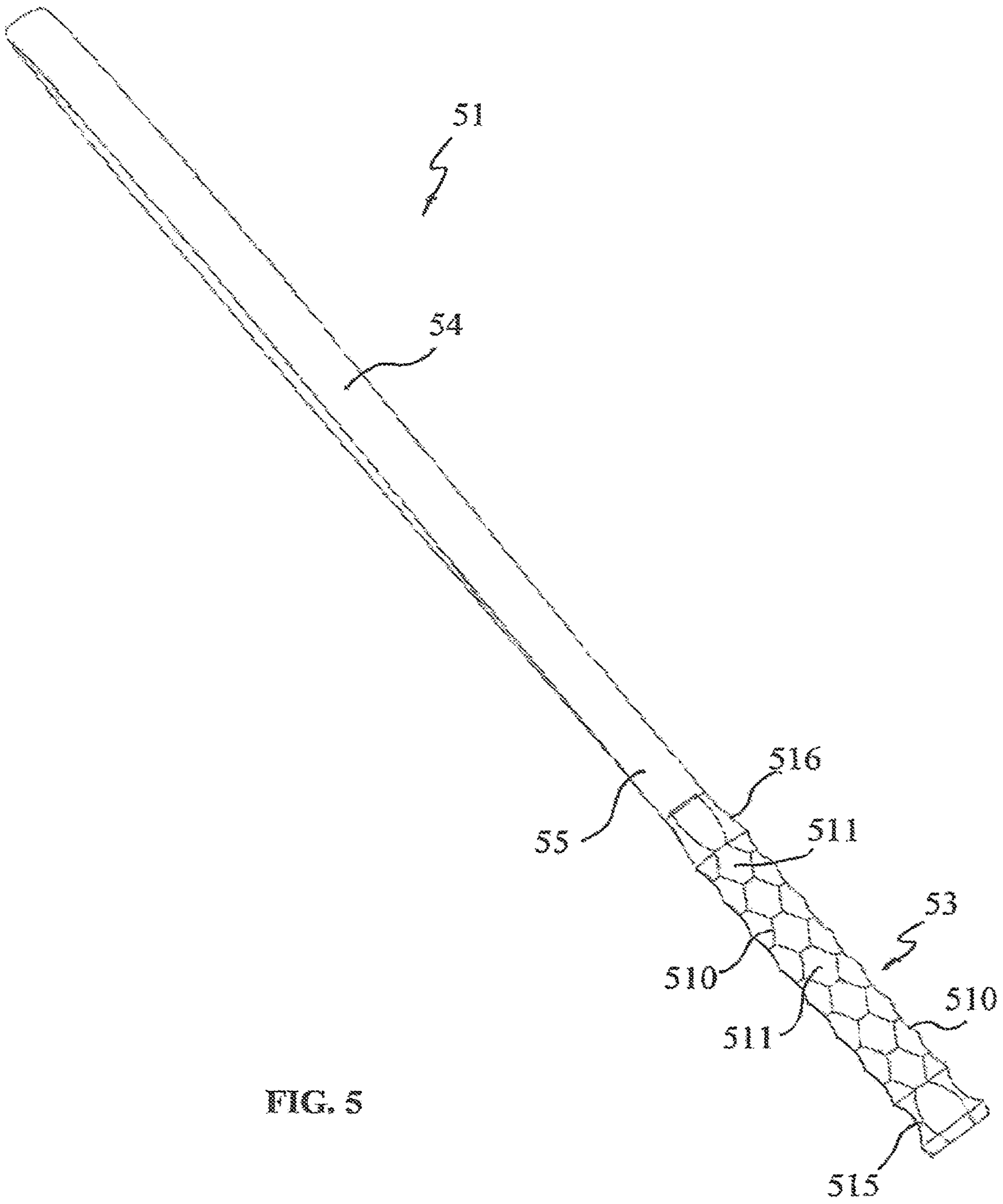
FIG. 5 is a perspective view of a sport equipment provided with the handle in a second preferred embodiment.
Figure 6:
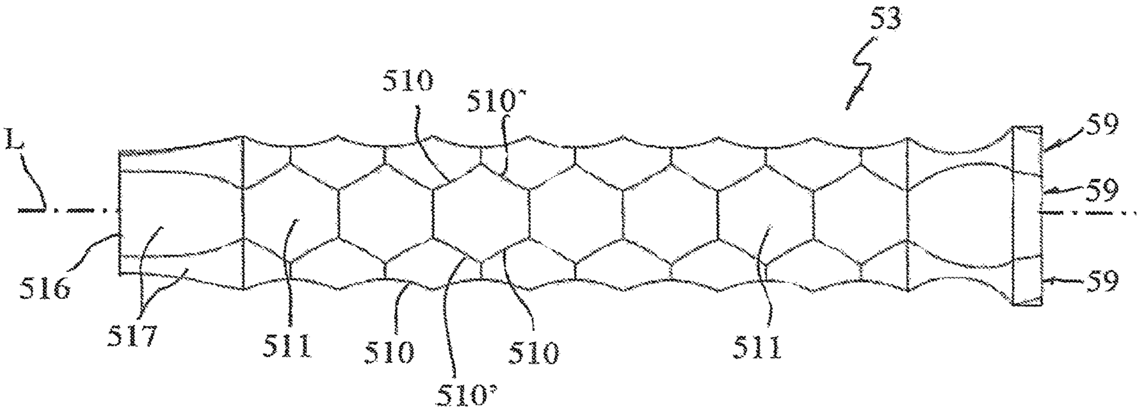
FIG. 6 is a first side view of the handle of the equipment of FIG. 5.
Figure 7:
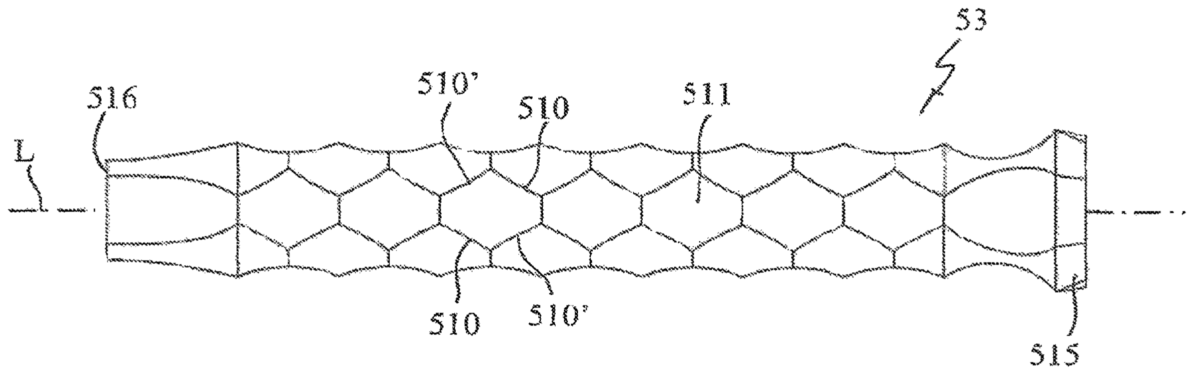
FIG. 7 is a second side view of the handle of the equipment of FIG. 5.

FIG. 5 shows a second embodiment of the handle 53 that differs from the previous essentially by the fact that the areas or flat surfaces 511, in which the longitudinal faces 59 are divided, are concave.

In addition, the edges 510 are not perfectly straight but slightly curved, in particular concave, so as to better accommodate the anatomy of the hand and to ensure greater comfort.

Figure 8:
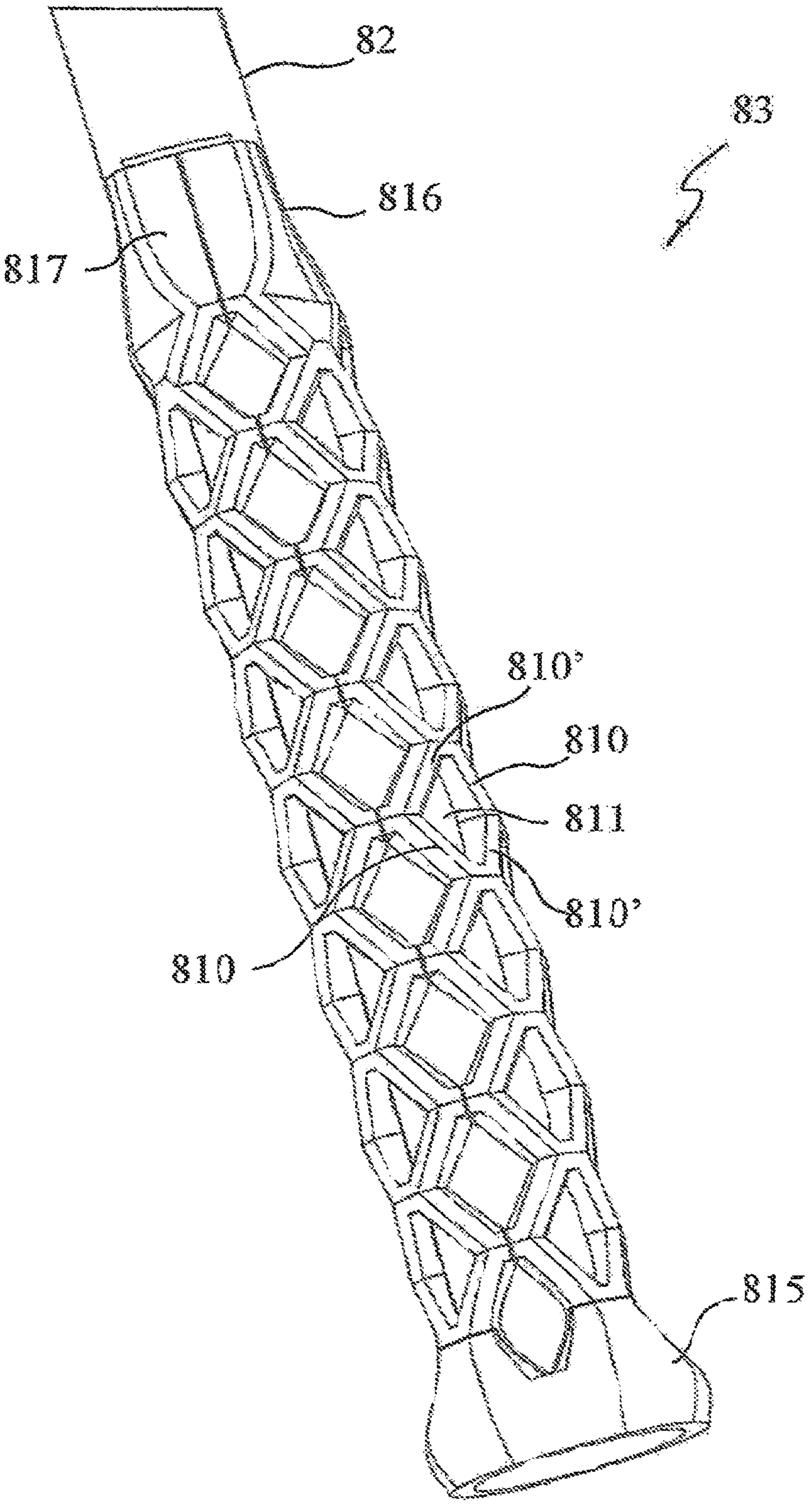
FIG. 8 is a perspective view of a detail of a sport equipment provided with the handle in a third preferred embodiment.
Figure 9:
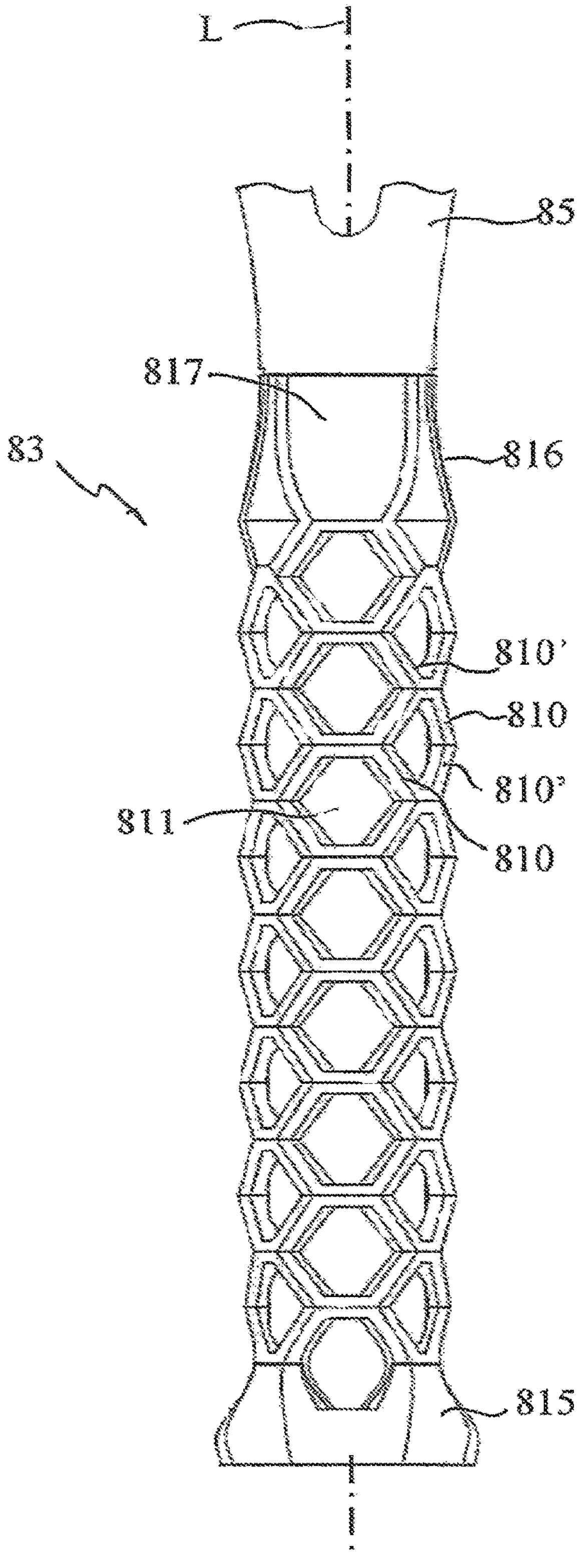
FIG. 9 is a first side view of the equipment of FIG. 8.
Figure 10:
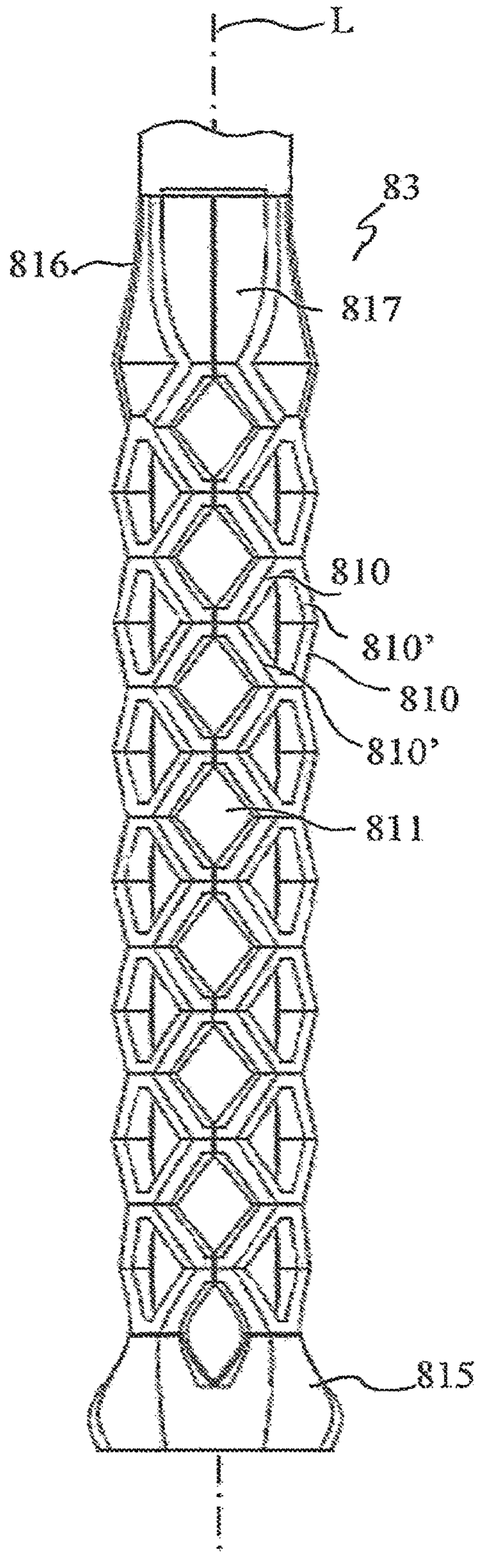
FIG. 10 is a second side view of the handle of the equipment of FIG. 8.

In the embodiment of FIG. 8 the areas or flat surfaces 811 have plan shape substantially similar to those of the embodiment of FIG. 1 but they are internally drilled to define a honeycomb structure.

The tubular body 87 also comprises one or more longitudinal aeration channels 818 open at the ends and which extend along respective longitudinal rows of faces, so as to promote the circulation of air and counteract the sweating of the hand.

The channels 818 are parallel to the longitudinal axis L of the handle 3 and may extend to the whole or just part of the longitudinal extension of the perimeter surface of the handle, intersecting with the concave or recessed surface of the flat surfaces 11.

The channels may also be also provided in the first two disclosed embodiments or in any embodiment according to the present invention.

In a known manner, the handle 3, 53, 83 may be coated with a grip or overgrip, not shown, selected among those commonly available on the market and which can be fixed to the handle in a traditional way, i.e. with a ribbon helically wound and fixed with an adhesive, or by different methods.

From above it is clear that the handle according to the invention reaches the intended objects and in particular to ensure high comfort and ergonomics to the grip in any mode of positioning of the hand.

The handle is susceptible of numerous modifications and variations, all falling within the inventive concept expressed in the accompanying claims. All the details may furthermore be replaced with other technically equivalent elements, and the materials may be different according to requirements, without departing from the scope of protection of the present invention.

I claim:

1. A hand-contact grip for sporting or working equipment, comprising:

a tubular body which extends along a longitudinal axis and has an outer peripheral surface adapted to be grasped by a user;

a plurality of edges adapted to facilitate position of at least one finger joint of a gripping hand of a user, wherein said plurality of edges is arranged along at least one pair of spiral paths that develops around said longitudinal axis with mutually opposite sign to subdivide said tubular body into a plurality of longitudinally aligned areas sized to accommodate a corresponding phalanx of the gripping hand of the user, each of said areas being perimetrically delimited by at least one pair of outwardly extending edges of each of the spiral paths of said at least one pair of spiral paths and each of said areas being internally recessed relative to an outermost extent of the at least one pair of outwardly extending edges; and a base continuously formed to said tubular body and defining a continuity with a first plurality of said areas, wherein at least a portion of said base has a maximum radius greater than a maximum radius of said tubular body, and said base lacks areas being internally recessed.

2. The grip as claimed in claim 1, characterized in that said spiral paths have the same longitudinal pitch.

3. The grip as claimed in claim 2, characterized in that said pitch is constant or variable along said longitudinal axis.

4. The grip as claimed in claim 1, characterized in that said edges are arranged along a plurality of pairs of spiral paths having mutually opposite sign to define respective double helices.

5. The grip as claimed in claim 4, characterized in that, for each of said pairs of spiral paths, said edges are rectilinear and inclined with respect to said longitudinal axis with an angle of inclination having same module and opposite sign with respect to the edges of the other spiral path to delimit corresponding areas having a polygonal plan shape.

6. The grip as claimed in claim 5, characterized in that said edges are curved.

7. The grip as claimed in claim 1, characterized in that at least one of said areas is recessed inwards.

8. The grip as claimed in claim 7, characterized in that each of said at least one areas conjoins with another adjacent area to define a pair of trapezoidal portions converging towards a common median edge.

9. The grip as claimed in claim 1, characterized in that each of said areas is perforated.

10. The grip as claimed in claim 1, wherein the areas are hexagonal with two transverse sides that join edges belonging to different spirals of a same pair.

11. The grip as claimed in claim 1, further comprising a top continuously formed to said tubular body at a portion of said longitudinal axis opposite said base, and defining a continuity with a second plurality of said areas, wherein said top lacks areas being internally recessed defining a polygon structure.

12. The grip as claimed in claim 1, wherein said internally recessed areas defining a polygon structure comprises a flat plane.

13. A sports or work equipment comprising:

a handle; and the grip of claim 1 on the outer surface of said handle.

14. Equipment as claimed in claim 13, wherein said handle is integral with the equipment.

15. Equipment as claimed in claim 13, wherein said handle is removably applied to the equipment.

16. Equipment as claimed in claim 13, characterized in that it is a racquet sports equipment.

17. Equipment as claimed in claim 13, wherein said spiral paths have the same longitudinal pitch.

18. Equipment as claimed in claim 13, wherein said edges are arranged along a plurality of pairs of spiral paths having mutually opposite sign to define respective double helices.

19. Equipment as claimed in claim 18, wherein, for each of said pairs of spiral paths, said edges are substantially rectilinear and inclined with respect to said longitudinal axis with an angle of inclination having same module and opposite sign with respect to the edges of the other spiral path to delimit corresponding areas having a polygonal plan shape.

20. Equipment as claimed in claim 13, wherein at least one of said areas is recessed inwards.

21. Equipment as claimed in claim 20, wherein each of said at least one areas is formed by a pair of trapezoidal portions converging towards a common median edge.

22. Equipment as claimed in claim 13, wherein each of said areas is perforated.

23. The hand-contact grip of claim 1, wherein outwardly extending edges surround each of said internally recessed areas in a closed manner to define each internally recessed area as a pocketed space.

24. The hand-contact grip of claim 23, wherein each of said internally recessed areas is shaped as a polygon.

25. The hand-contact grip of claim 24, wherein each of said outwardly extending edges terminates at width that is parallel with the tubular body at a higher radius than the tubular body out of which it extends.

* * * * *